United States Patent
Sweeney et al.

(10) Patent No.: US 6,568,063 B1
(45) Date of Patent: May 27, 2003

(54) CONCENTRIC DRIVE METHOD AND APPARATUS

(75) Inventors: James Sweeney, Hull, MA (US); Robert Bennett, Boston, MA (US)

(73) Assignee: Custom Machine & Tool Co., Inc., East Weymouth, MA (US)

(*) Notice: Subject to any disclaimer, the term of this patent is extended or adjusted under 35 U.S.C. 154(b) by 0 days.

(21) Appl. No.: 09/544,391

(22) Filed: Apr. 6, 2000

Related U.S. Application Data (60) Provisional application No. 60/128,510, filed on Apr. 9, 1999.

(51) Int. Cl.$^7$ .............................. B23P 11/00; F16B 2/00
(52) U.S. Cl. .............................. 29/525.01; 29/894.361; 403/356; 403/370; 403/374.3
(58) Field of Search ................. 29/428, 525.01, 29/894.361; 403/355, 356, 358, 371, 370, 368, 374.1, 374.3, 374.4

(56) References Cited

U.S. PATENT DOCUMENTS

| | | | | |
|---|---|---|---|---|
| 208,884 A | | 10/1878 | Blake et al. | |
| 2,010,451 A | * | 8/1935 | Browning | 403/358 |
| 2,402,743 A | | 6/1946 | Firth | 287/52 |
| 2,446,846 A | | 8/1948 | Noble | 189/36 |
| 2,509,711 A | | 5/1950 | Williams | 287/52 |
| 2,535,729 A | * | 12/1950 | Firth | 403/354 |
| 2,570,604 A | | 10/1951 | Siegerist | 287/52 |
| 2,571,699 A | | 10/1951 | Firth | 287/52.06 |
| 2,807,485 A | * | 9/1957 | Seibert | 403/356 |
| 2,818,288 A | | 12/1957 | Karlson | 298/53 |
| 2,855,228 A | * | 10/1958 | Kreissig et al. | 403/358 |
| 3,368,833 A | | 2/1968 | Chung | 287/52.06 |
| 3,677,583 A | | 7/1972 | Steinke | 287/52.06 |
| 3,709,575 A | | 1/1973 | Howe, Jr. | 308/236 |
| 3,815,432 A | * | 6/1974 | Maurey et al. | 474/43 |
| 4,411,551 A | | 10/1983 | Adelbratt | 403/370 |
| 4,465,395 A | * | 8/1984 | Mullenberg | 403/356 |
| 4,494,889 A | * | 1/1985 | Thompson | 403/4 |
| 4,512,681 A | * | 4/1985 | Hayhurst et al. | 403/370 |
| 4,598,443 A | * | 7/1986 | Ostling et al. | 24/136 R |
| 4,615,532 A | * | 10/1986 | Biller et al. | 279/32 |
| 4,624,597 A | * | 11/1986 | Johnson et al. | 403/16 |
| 4,711,605 A | * | 12/1987 | Hodlewsky | 403/355 |
| 5,304,101 A | | 4/1994 | Baer | 474/170 |
| 5,613,795 A | * | 3/1997 | Antony et al. | 403/370 |
| H1647 H | * | 5/1997 | Appleman | 403/355 |
| 5,639,176 A | * | 6/1997 | Mullenberg | 403/282 |
| 6,309,136 B1 | * | 10/2001 | Kellenberger et al. | 403/374.3 |
| 6,328,361 B1 | * | 12/2001 | Spear | 294/57 |

FOREIGN PATENT DOCUMENTS

| | | | | |
|---|---|---|---|---|
| DE | 1890447 U | | 4/1964 | |
| DE | 3507452 | * | 1/1986 | 403/370 |
| DE | 3536920 | * | 9/1986 | 403/370 |
| EP | 239551 | * | 9/1987 | 403/164 |
| GB | 2026650 | * | 2/1980 | 403/370 |
| GB | 2 207 216 A | | 1/1989 | |
| JP | 401275917 | * | 11/1989 | 403/368 |

OTHER PUBLICATIONS

Schwartz et al., "Making the right shaft connections", *Power Transmission Design*, Aug. 1996, pp. 65–68.

"Taper–Lock Bushings", *Dodge Power Transmissions Components Engineering Catalog*, 1996, pp. 163–178.

* cited by examiner

*Primary Examiner*—Gregory Vidovich
*Assistant Examiner*—Essama Omgba
(74) *Attorney, Agent, or Firm*—Bromberg & Sunstein LLP (57) ABSTRACT

A method for improving the concentricity of a coupling between a shaft and a hub in a motion control system. The shaft is coupled to the hub by means of a bushing that may be drawn into the hub by means of a single set screw. The depth of the bushing exceeds a calculated critical cocking length. The bushing may be split and may also be tapered, and in certain embodiments, has a bore of diameter smaller than 0.5 inches.

10 Claims, 7 Drawing Sheets

CONCENTRIC DRIVE METHOD AND APPARATUS

This application claims priority from U.S. Provisional Application No. 60/128,510, filed Apr. 9, 1999, which is incorporated herein by reference.

TECHNICAL FIELD

The present invention relates to a method and apparatus for mechanical power transmission and position or timing control by means of a belt or chain driven by an arrangement of a shaft and sprocket or pulley in which the shaft is coupled to the sprocket or pulley by means of a tapered bushing so as to ensure substantially concentric motion of the components and to allow phasing of the shaft-mounted components.

BACKGROUND OF THE INVENTION

Typical torques employed in both mechanical power transmission and motion control applications are often such as to cause significant problems with torque transmission between a shaft and any gears, pulleys or sprockets that are intended to be driven by the shaft. Various methods that are employed to achieve the requisite coupling of torque include set screws, pins, keys, flattened shafts, flanged bushings and clamping couplings of various sorts.

Additionally, in power transmission applications employing sufficiently large shafts, tapered bushing assemblies are known for coupling rotating shafts to sprockets so that rotary motion of the shaft may be transmitted to the sprocket. In the power transmission art, the coupling of substantial torque between a shaft and a hub by a bushing gives rise to requirements such as keys, flanges coupled to the exterior face of the sprocket, and/or large surface areas of interface between the bushing and the shaft and hub respectively. The use of large surface areas of interface is based on the proportionality of static friction, for transmission of shear forces, to the contact area between the surfaces. A typical prior art hub and bushing structure is now described with reference to FIGS. 1 and 2.

Figure 1:
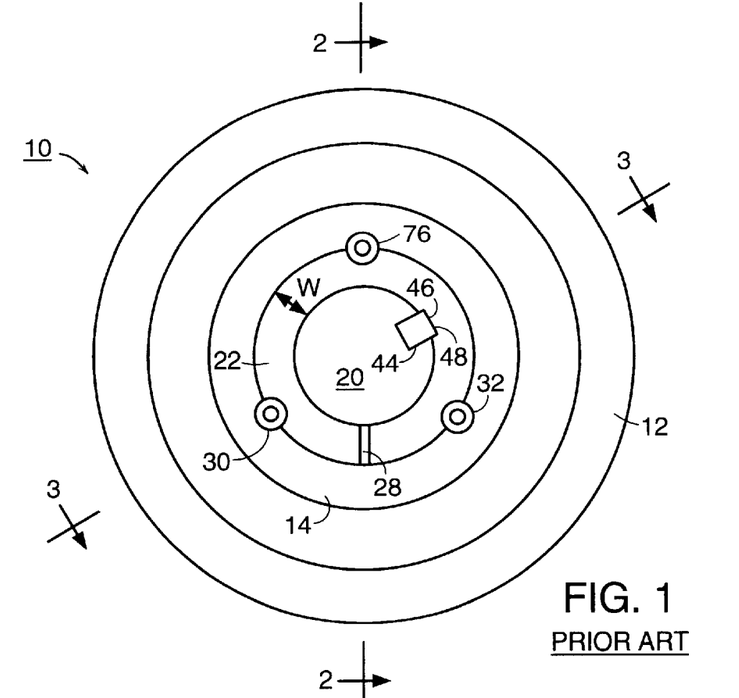
FIG. 1 is a side elevational view of a shaft/sprocket coupling employing a prior art bushing.

Numeral 10 designates generally a sprocket or pulley for driving a chain or belt (not shown), the sprocket having an outer surface 12 and a hub 14. The subject of the present discussion is the coupling of torque between a rotatable shaft 20 of constant diameter and hub 14 by means of a bushing 22. In the power transmission art, the coupling of substantial torque between shaft 20 and hub 14 via bushing 22 is commonly accomplished by using keyways machined into interior bore 46 of the bushing and outside diameter 44 of the shaft, with a solid square key 48 inserted into the machined spaces. The use of square keys and keyways for obtaining maximum torque is described in ANSI Standard B17.1, Keys and Keyseats, which is incorporated herein by reference. In this way, the torque that may be coupled by means of shear forces exerted on the keyways increases as the size and strength of the key and keyways increase. Alternatively, torque may be transmitted by means of one or more connectors or pins inserted through an annular flange of the bushing and a side face of the hub. When an annular flange is employed, the maximum diameter of the bushing exceeds the inside diameter of the hub.

Figure 2:
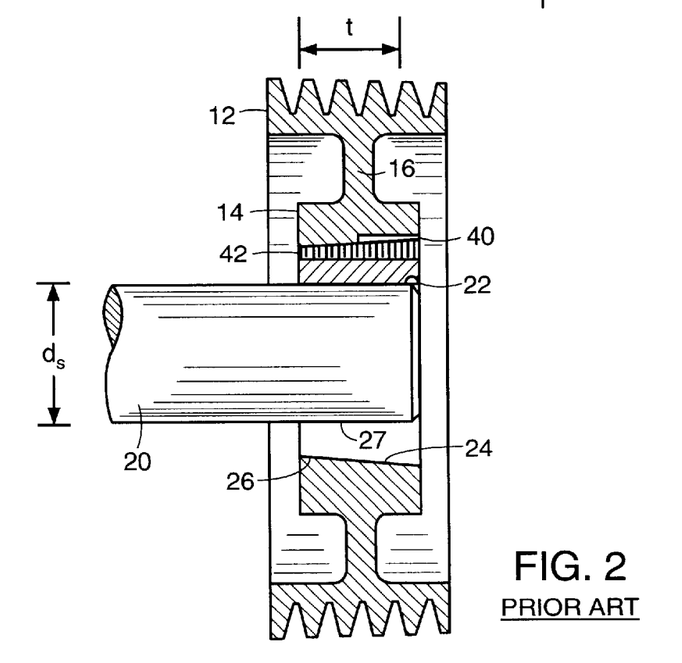
FIG. 2 is a cross-sectional of the prior art shaft/sprocket coupling of FIG. 1, the section being taken along line 2—2 of FIG. 1.

Referring now to FIG. 2, a cross-sectional view is shown of the prior art sprocket 10 and bushing 22, with the section taken on line 2—2 of FIG. 1. Mating tapered surfaces of the outside 24 of bushing 22 and the inside 26 of hub 14 are shown, while internal surface 27 of bushing 22 is shown to be straight and parallel with the surface of shaft 20. Bushing 22 is continuous throughout with the exception of a radial slot 28 of sufficient width to permit the bushing to contract during installation and to grip the shaft firmly. Tapered surfaces 24 and 26 of the bushing and hub, respectively, are adapted to slide relative to one another as the sprocket is assembled onto the shaft and the bushing is secured in place within hub 14 In a power transmission application, the scaling relationships that are known to hold require that the surface area in contact between bushing 22 and hub 14 must increase at least as fast as the torque required to be transmitted.

In order to insert bushing 22 into hub 14 of sprocket 10, a force is required to overcome the sliding friction developed across the entire contact surface area between the bushing and the hub. A similar sliding friction must be overcome to disengage the bushing from the hub. The sliding friction that must be overcome is proportional to the surface area and thus, as discussed above, to the torque capacity of the bushing.

Since the objective of power transmission applications is typically the transmission of a maximal amount of torque for given geometrical and material constraints, it has been deemed desirable, in the prior art, to maximize the contact surface area (~T) between the bushing and hub. This makes it difficult, however, to overcome the frictional hurdles both for insertion and disengagement of the bushing. Therefore, the prior art teaches that a taper with an included angle of at least 8° (equivalent to a taper angle $\alpha=4°$) is placed on external surface 24 of bushing 22 and internal surface 26 of hub 14 in order to reduce the difficulty in releasing the bushing. Typically, a threaded hole 76 (shown in FIG. 1) is provided for insertion of a jack-screw so that force may be applied for release of the bushing.

Engagement of the bushing, moreover, requires that both the sliding friction across the contact surface as well as the lateral component due to the taper must be overcome. In the prior art, this has been accomplished by use of at least two screws 30 and 32, along with matching tapped threading on the hub, for drawing the bushing into the hub. Consequently, clearance must be provided in the placement of the components for tightening the bushing and for removing the bushing using a jackscrew. An additional concern is the square entry of the bushing upon insertion; since the contact surface area is large (scaling~T), the bushing is prone to cocking upon insertion if care is not taken in driving the symmetrically placed screws.

Additionally, the scaling relations of the prior art power transmission applications dictate that the annular width w (shown in FIG. 1) of bushing 22 must scale substantially as the bushing face thickness t since $t\sim T^{1/2}$. The annular width, however, is half the difference between the outer diameter and inner bore of the bushing. Therefore, $w\sim d_p-d_s\sim\gamma T^{1/2}-\zeta T^{1/3}$, where $\gamma$ and $\zeta$ are coefficients of proportionality. The annular width dimension, w, typically scales as $T^{1/2}$ in the limit of large torque, which is the limit of interest in prior art power transmission applications. While the foregoing scaling relations are not intended to be definitive or descriptive of all bushings available in the prior art, they are intended to illustrate the nature of design considerations governed primarily by maximizing torque capacity as taught in the power transmission art.

SUMMARY OF THE INVENTION

In accordance with a preferred embodiment of the present invention, there is provided a method for applying a bushing to improve the concentricity of a coupling between a shaft and a hub having a central bore. The bushing has an interior bore for surrounding the shaft and exactly one exterior slot in a direction parallel to the interior bore for matching a corresponding slot in the hub. Each matched part of the slot defines an opening for receiving a set screw. The method includes driving the set screw into the exterior slot in such a manner as to draw the bushing into the bore of the hub, thereby coupling the shaft to the hub.

In accordance with alternate embodiments of the present invention, there is provided a method for improving the concentricity of a coupling between a shaft and a hub of the type where the shaft has a diameter less than 0.5 inch. The method has the steps of providing a split tapered bushing, where the bushing has an inner bore of less than 0.5-inch diameter and an outer diameter smaller than the inner diameter of the hub, and using the bushing to couple the shaft to the hub.

In accordance with a further aspect of the present invention, there is provided a device for coupling a shaft to a hub, where the hub is of a first material and has a first surface finish. The device has a split bushing with an exterior surface and an interior bore of diameter less than 0.5 inch and a depth. The bushing has an annular width defined as a normal distance between the interior bore and the exterior surface. The device also has at least one transversely located exterior slot for matching a corresponding slot in the hub, each matched part of the slot defining an opening for receiving a set screw. In accordance with alternate embodiments of the present invention, the device may have exactly one transversely located exterior slot, and the exterior surface of the bushing may be tapered at an angle less than three degrees with respect to the axis of the shaft. The bushing may be of a material or surface finish distinct from that of the hub.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

In precision position and motion control applications, considerations driving the design of shaft/sprocket couplings may be other than those of maximizing torque, as in the prior art power transmission applications, and, more particularly, may include the precision concentricity of the shaft and sprocket rotation axes and convenience of assembly and disassembly in tight spaces. Precision concentricity may be required to prevent wobble of the driven components and the wear and noise that may result from imperfect balance. Additionally, in motion control applications, it may be desirable to phase or synchronize various elements of a drive train independently of shaft position. Such phasing may be advantageously accomplished in accordance with certain embodiments of the present invention.

Preferred embodiments of the present invention are now described with reference to the motion control system shown in FIG. 3. A drive system is shown, and designated generally by numeral 300. Drive system 300 might be used, for example, in a timing application, wherein a timing belt 302 which is typically toothed transmits the angular rotation of shaft 301 to corresponding angular rotation of shaft 304 by virtue of toothed timing belt 302 meshing with sprockets 306 and 308. It is often critical that the rotation of sprocket 306 exhibit no slip with respect to the rotation of shaft 301, and further that the rotation of the assembly 310 of sprocket 306 be as nearly concentric as possible with the rotation of shaft 301. To achieve a high degree of concentricity of rotation, a bushing 312 is provided, in accordance with a preferred embodiment of the invention. Shaft 301 may be extremely small compared to any shafts used in typical power transmission applications since the torque transmitted by the shaft/sprocket assembly 310 may not be substantial.

Since maximizing torque transmission does not drive design parameters in this application, bushing 312 is not limited by constraints provided in the prior art. Novel configurations of bushing 312 are now described with reference to FIG. 4, wherein are shown cross-sectional views of bushing 312 in accordance with alternate embodiments of the invention. Exterior surface 406 may be treated, as by plating, so as to have distinct surface properties from the surface properties of the sprocket into which bushing 404 is inserted, thereby advantageously reducing the propensity of the bushing to bind upon insertion. Additionally, bushing 404 may be fabricated of a material, such as a metal or a plastic, differing in composition from the material of the sprocket so as to reduce the propensity of the bushing to bind upon insertion into the sprocket. Bushing 404 shown in cross-section in FIG. 4 has exterior surface 26 tapered at taper angle α, where α is less than 3°. This is a substantially shallower angle than known for the taper of bushings in the power transmission art and may be accommodated, in accordance with embodiments of the invention, where torque transmission requirements do not drive the bushing design. Additionally, referring again to FIG. 3, where binding is not a problem, a single screw 314 will suffice to draw bushing 312 into sprocket 306, and the use of a jack screw in screw-hole 316 may be employed for disengagement of the bushing from the sprocket. Bushing 312 may be split, at one or more locations, to facilitate insertion of the bushing into the sprocket.

Where the scaling relations taught in the prior art are obviated by the teaching embodied in the present application and no longer constrain the design dimensions of a tapered bushing, the resultant device is within the scope of the present invention.

Figure 3:
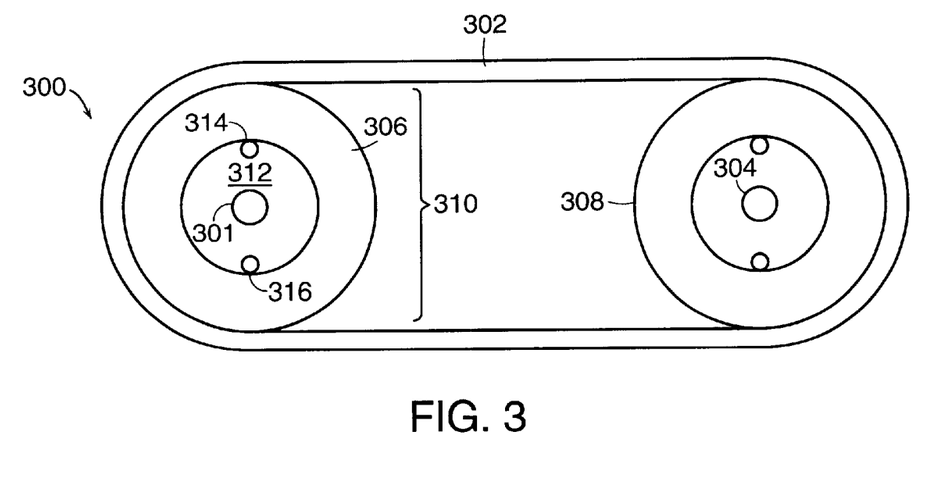
FIG. 3 is perspective view of a motion control system, having a shaft and a sprocket with an outer hub undergoing motion concentric to the shaft in accordance with a preferred embodiment of the present invention.
Figure 4:
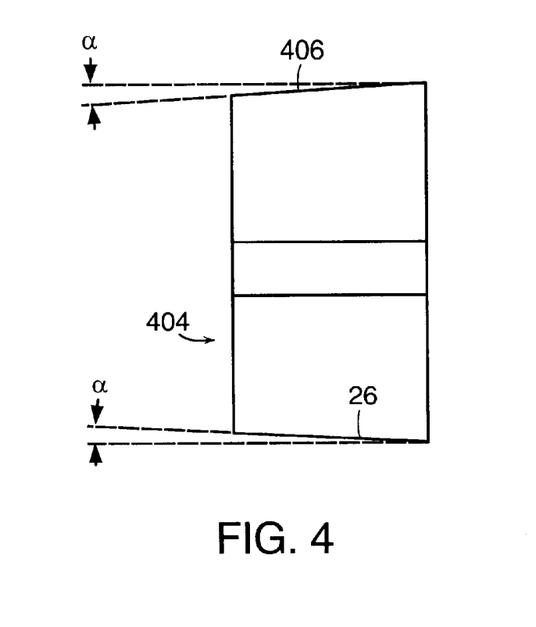
FIG. 4 is a cross-sectional view of a tapered bushing with a small taper angle in accordance with an embodiment of the present invention.
Figure 5A:
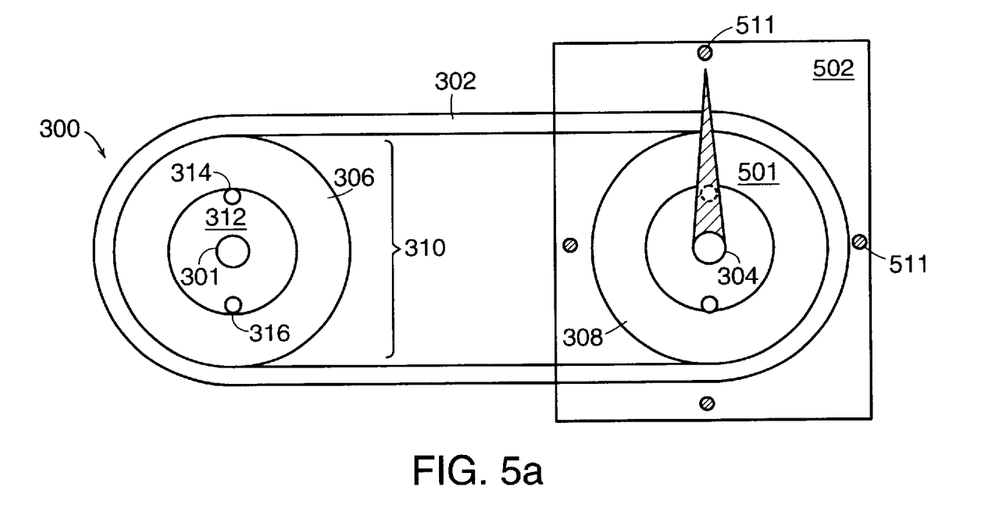
FIG. 5a is a perspective view of the motion control system of FIG. 3, configured to drive a clock hand.
Figure 5B:
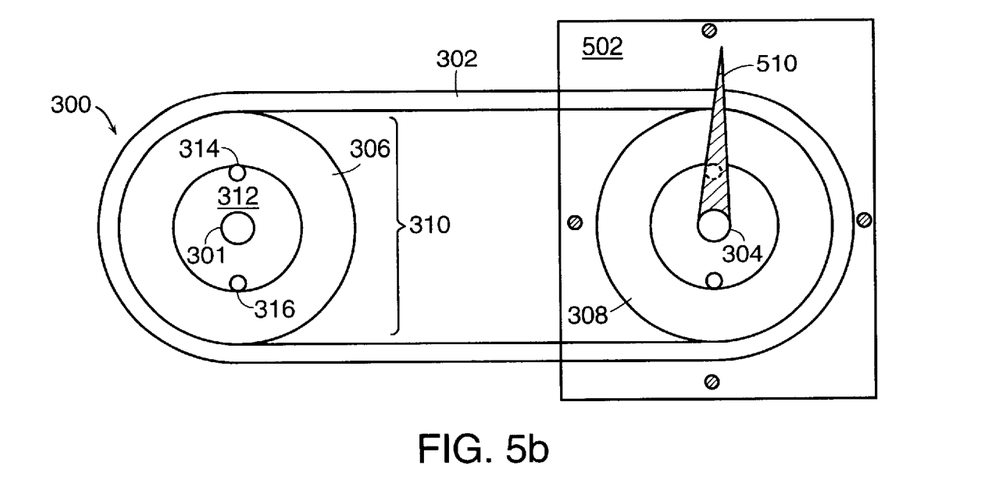
FIG. 5b is a perspective view of the motion control system of FIG. 5a, wherein the clock hand requires phasing with respect to the clock face, as may be advantageously achieved in accordance with an embodiment of the present invention.

Referring now to FIGS. 3, 5a, and 5b, phasing or synchronization of the various drive elements 306, 308, 304 may be accomplished independently of drive shaft 301 when, in accordance with preferred embodiments of the present invention, there is no key/keyway arrangement required to transmit torque from the shaft 301 to the bushing assembly 312, 314, 316. For example, if shaft 301 were the drive shaft of a stepper motor (not shown) providing a fixed six degrees of angular rotation per step, and the driven shaft 304 were attached to the hand of a clock 501, the motion of the clock hand, given equal diameters of pulleys 306 and 308, would be six degrees or one discrete increment. In FIG. 5a the clock hand 501 is synchronized with the markings on the clock face 502, and subsequent six degree steps will also be phased to the clock face markings 502. In FIG. 5b, however, clock hand 510 is out of phase with the clock face markings 511 by approximately four degrees of clockwise rotation and upon subsequent six degree steps will continue to be misaligned by four degrees. In accordance with embodiments of the present invention, it is possible to synchronize the elements 501 and 502 by disengaging bushing 312 from shaft 301 and rotating assembly 310 either two degrees clockwise or four degrees counterclockwise, then retightening bushing 312 to shaft 301. This phasing or synchronization would not be possible with the prior art key/keyway torque transmission assembly.

Figure 6:
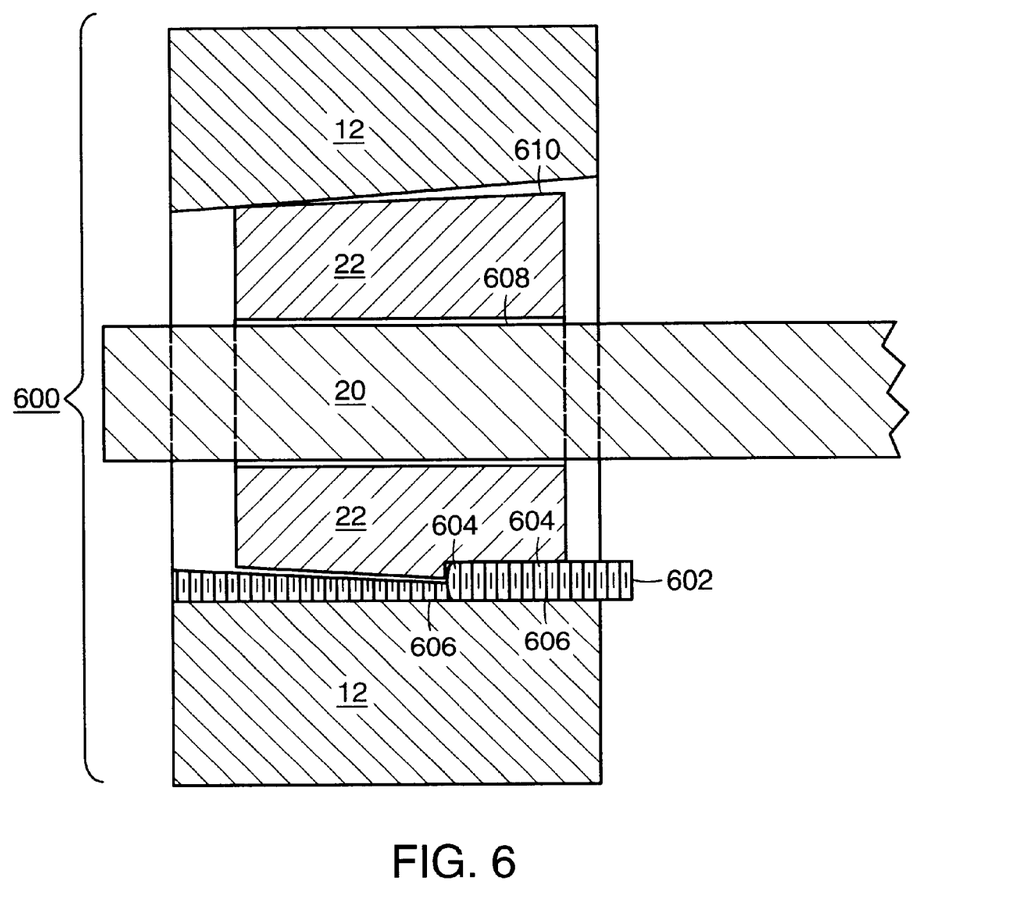
FIG. 6 shows a cross section of a shaft/bushing/hub assembly having a single screw for insertion of the bushing in accordance with embodiments of the present invention.

Referring now to FIG. 6, a cross section is shown of a shaft/bushing/hub assembly 600 in accordance with an alternate embodiment of the present invention. A tapered bushing 22 is shown surrounding shaft 20, engaged within hub 12. Bushing 22 is shown as drawn into hub 12 by means of a single screw 602 by action against slot 604 machined into bushing 22 and threads 606 formed into hub 12. Use of a single screw may provide many advantages including ease of assembly and prevention of cocking due to uneven tightening of multiple screws.

While both inner surface 608 and outer surface 610 of bushing 22 are shown as smooth, surfaces of other finish are within the scope of the present invention.

In order to engage a bushing between a shaft and a hub by means of a single screw, in accordance with the present invention, it is necessary to ensure that there be no cocking of the bushing during insertion resulting in incomplete insertion or nonconcentricity. Cocking refers to the mechanical tendency for the bushing/hub surfaces to stick rather than slide upon insertion of the bushing, resulting in incomplete insertion or nonconcentricity. Because of the issue of cocking, the use of a single screw for drawing the bushing into the hub has not been considered in the prior art.

Figure 7A:
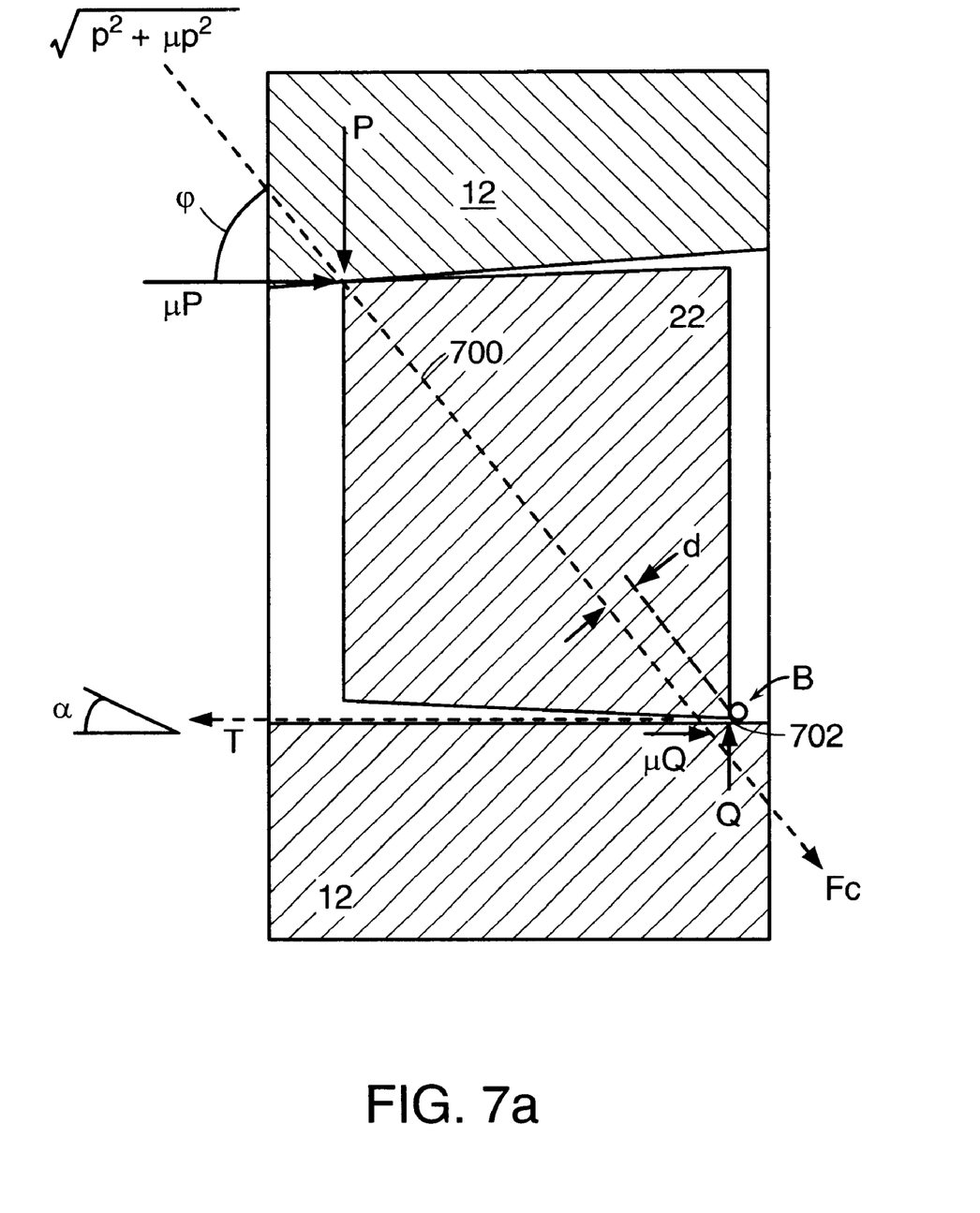
FIG. 7a is a cross-sectional view of a tapered bushing, in accordance with embodiments of the present invention, showing the forces acting on the bushing that may cause cocking of the bushing upon insertion within the central bore of a hub.
Figure 7B:
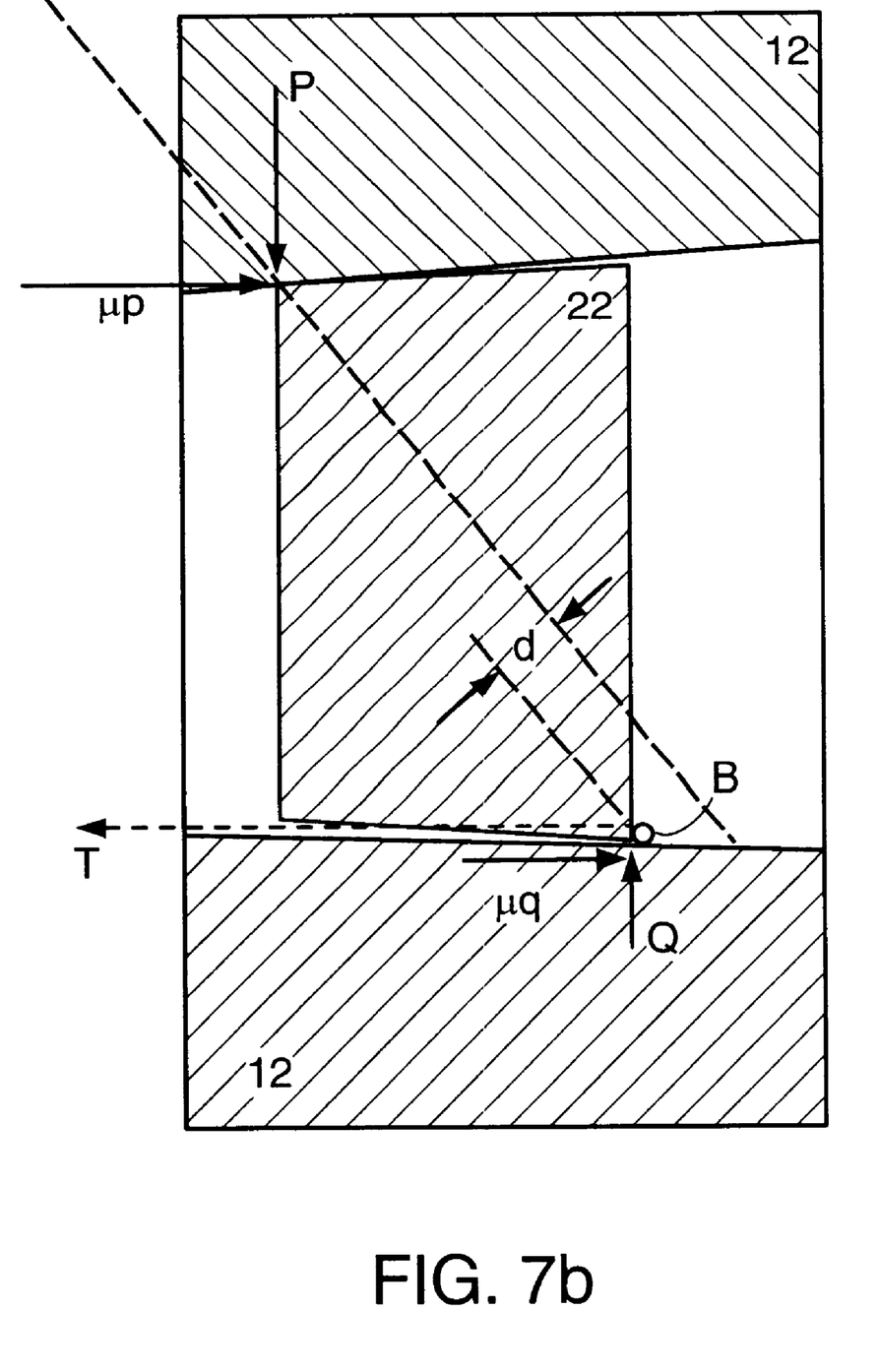
FIG. 7b is a cross-sectional view of a tapered bushing, as shown in FIG. 7a, wherein the depth of the bushing is less than the critical cocking length, in accordance with an embodiment of the present invention.

Parameters relevant to considerations of cocking are discussed with reference to FIGS. 7a and 7b which show bushing 22 in cross section and the forces acting upon the bushing during insertion. Elasticity of the bodies, the shaft 20 (shown in FIG. 6), and the actual geometry of the various embodiments of the invention, have been neglected for purposes of the present simplified discussion. Consideration of particular material and geometrical considerations are known to persons skilled in the mechanical arts. Bushing 22 is driven into the surrounding bore of the hub by action of screw 602 (shown in FIG. 6) acting at a position B on the periphery of the bushing. The thrust force of insertion is indicated by the vector T. Assuming, first, a 'slightly cocked' configuration as shown in FIG. 6, with bushing 22 contacting hub 12 at opposite corners, a force $F_c$ is exerted through a line of action designated by numeral 700 due to friction between the surface of bushing 22 and the surface of hub 12. The surface tractions acting on the bushing are shown resolved into forces with normal and tangential force components. The lateral force P between the bushing and the hub is a function of the taper angle α of the bushing while the component of its force $F_c$ opposing the thrust vector is proportional to the coefficient of friction $\mu$, by definition of the coefficient of friction. It is the moment of the cocking force acting through moment arm d between the point B of action of the screw and the line of action 700 of the cocking force that causes cocking of the bushing. The resulting anticlockwise moment shown in FIG. 7a will rotate bushing 22, allowing sliding of the bushing along interface 608 (shown in FIG. 6). On the other hand, the clockwise net moment shown in FIG. 7b will rotate bushing 22 in such a manner as to cause sticking along interface 608 resulting in cocking. Thus, cocking will occur when the cocking moment is such as to drive the exterior edge 702 of the bushing into the bore of the hub. This occurs when the cocking moment is directed in a clockwise direction, as shown in FIG. 7b. The occurrence of cocking defines a critical cocking length (CCL). Cocking is prevented if the depth of the bushing into the bore of the hub exceeds the critical cocking length. It is apparent from FIG. 7a that the critical cocking length is approximately equal to $d \tan \phi$, where $\phi$ is the angle between the axial thrust force and the line of action of the cocking force, and is approximately equal to $\mu$. Thus, approximating again, a cock ratio, defined as the ratio of the CCL to the diameter of the bushing, is of the order of the coefficient of friction. It is preferred that the depth of the bushing exceed the cocking length in accordance with the embodiments of the invention that provide for the use of a single set screw to draw the bushing into the hub.

Figure 8:
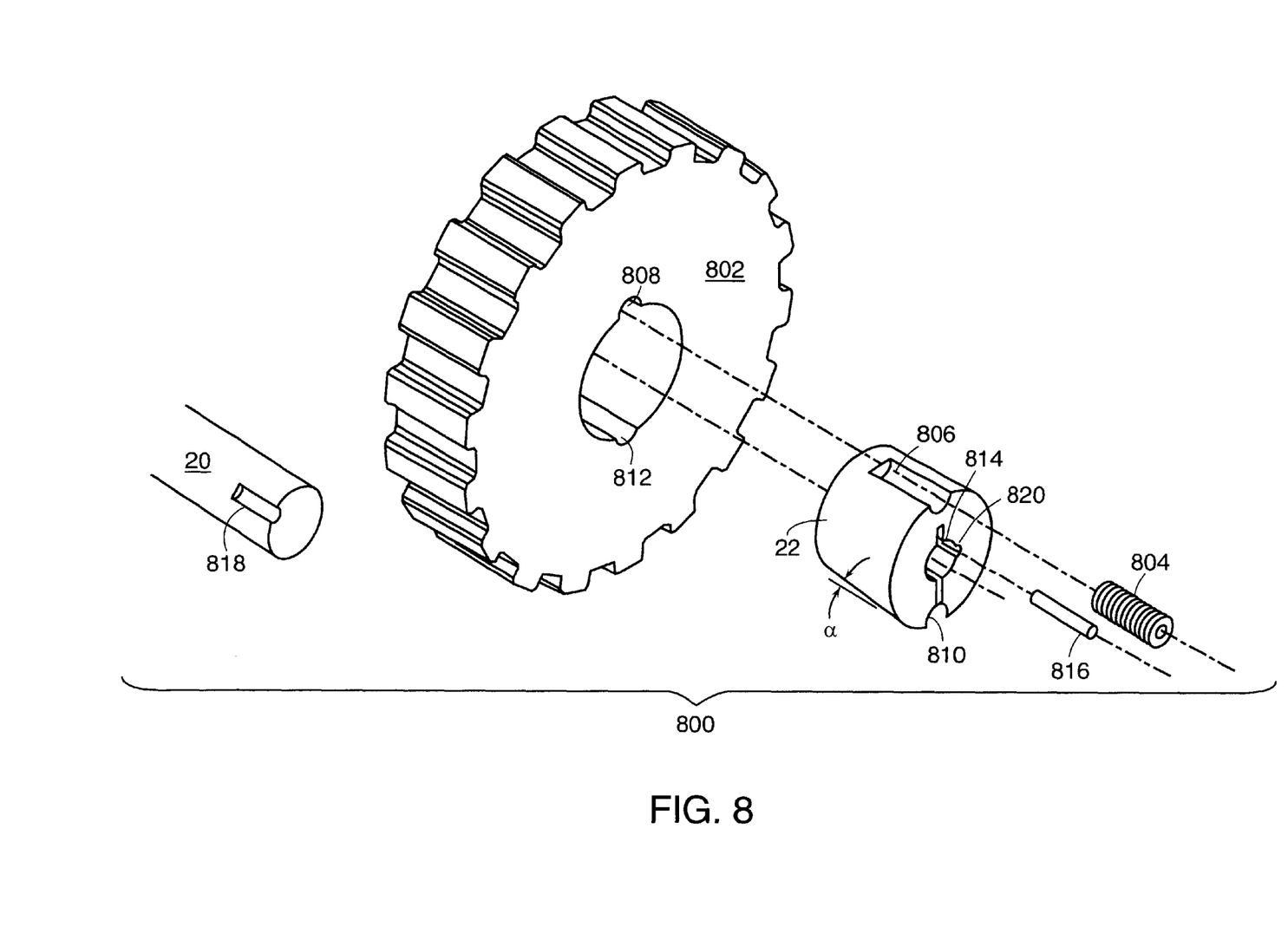
FIG. 8 is an exploded view of a tapered bushing retained within a sprocket by means of a single screw and a pin, showing additionally the use of a round key in accordance with embodiments of the present invention.

Referring now to FIG. 8, an exploded view is shown of a shaft/bushing/hub assembly 800 in accordance with an alternate embodiment of the present invention. A split-hub bushing 22 of taper angle α is shown with a corresponding sprocket 802. Bushing 22 may be drawn into sprocket 802 and secured by means of a single screw 804 (shown, by way of example, as a set screw) threaded to match the threads of slot 808 in sprocket 802 and unthreaded blind clearance slot 806 in bushing 22. Screw 804 may advantageously be large for obtaining higher torque than may be obtained for smaller screw diameters. In fact, in accordance with an embodiment of the present invention, the diameter of screw 804 may exceed the diameter of bore 814 of bushing 22. Additionally, a further slot or keyway 820 may be provided in bushing 22 with a corresponding slot 818 in shaft 20 to accommodate a key such as a conventional square key, a straight dowel pin or a spiral slotted spring pin, for example.

The method of using square keys, as used in the power transmission art and as described above in connection with the background to the present invention, is not practical when smaller shafts are used, due to the loss of shaft strength from machining the keyway 44 (shown in FIG. 1). In fact, shafts of diameter less than 5/16" are not addressed in ANSI Standard B17.1 discussed above. In the case of small shafts, and in accordance with an alternate embodiment of the present invention, keys and keyways of circular cross section may be used, thereby reducing stress concentrations inherent in square and rectangular key and keyway assemblies to an extent even greater than that addressed in Section 8, ANSI Standard B17.1 —Chamfered Keys and Filleted Keyseats. This reference states, at p. 11, that: "In general practice, chamfered keys and filleted keyseats are not used. However, it is recognized that fillets in keyseats decrease stress concentrations at corners." Use of a pin 816 of circular cross-section minimizes mutilation of shaft 20 required to provide a shear, rather than a frictive, fit of shaft to hub. By minimizing the shaft mutilation, the load carrying ability of the shaft may be maximized. Use of a split spring pin or spiral roll pin, for example, axially located between shaft 20 and bushing 22, maximizes the contact area between round key 816, shaft keyway 818, and bushing keyway 820, where each of the shaft keyway 818, and bushing keyway 820 have cross-sectional geometries that are portions of a circle. The contact area may be critical, particularly when impact loads or stress reversals are involved in the application. While shaft design practice requires degradation of shaft loads to 75% of otherwise standard working loads when square keyways are machined into the shaft (*Machinery's Handbook*, 22nd Edition, p. 350), the cutting of a keyway of circular cross-section in accordance with embodiments of the present invention does not require as significant a degradation in load capacity. Other techniques known in the art for increasing the torque transmission capability between the shaft and bushing may be incorporated within the scope of the present claims. For example, the use of a tab integral to the bushing with a flatted portion that may be caused to clamp the shaft by means of a setscrew is described in U.S. Pat. No. 3,598,432, which is incorporated herein by reference.

The described embodiments of the invention are intended to be merely exemplary and numerous variations and modifications will be apparent to those skilled in the art. All such variations are intended to be within the scope of the present invention as defined in the appended claims.

We claim:

1. A method for improving the concentricity of a coupling between a shaft and a hub having a central bore, the method comprising:
   a. providing a split bushing having an interior bore for surrounding the shaft, and a tapered non-grooved external surface for transferring torque to the hub entirely by friction, and exactly one exterior slot in a direction parallel to the interior bore for matching a threaded slot in the hub, thereby defining an opening for receiving a set screw; and
   b. driving the set screw into the exterior slot such as to draw the bushing into the bore of the hub, thereby coupling the shaft to the hub.

2. A method for improving the concentricity of a coupling between a shaft and a hub of the type where the shaft has a diameter less than 0.5 inch, the hub having an inner diameter, the method comprising:
   a. providing a split tapered bushing, the bushing having an inner bore of less than 0.5-inch diameter, an outer diameter smaller than the inner diameter of the hub and a tapered non-grooved external surface for transferring torque to the hub entirely by friction, wherein the inner bore surrounds the shaft and the bushing has exactly one exterior slot in a direction parallel to the inner bore for matching a threaded slot in the hub; and
   b. using the bushing to couple the shaft to the hub.

3. A device for coupling a shaft to a hub of a first material having a first surface finish, the hub having an inner diameter, the shaft having an axis of rotation, the device comprising:
   a. a split bushing having a non-grooved tapered exterior surface for transferring torque to the hub entirely by friction and an interior bore, an outer diameter smaller than the hub, and a depth, the bushing further having an annular width defined as a normal distance between the interior bore and the exterior surface; and
   b. exactly one exterior slot in the bushing having a long dimension parallel to the interior bore for matching a threaded slot in the hub thereby defining an opening for receiving a set screw.

4. A device according to claim 3, wherein the depth of the bushing exceeds a critical cocking length.

5. A device for coupling a shaft to a hub of a first material having a first surface finish, the hub having an inner diameter, the shaft having an axis of rotation, the device comprising:
   a. a split bushing, the bushing having a non-grooved exterior surface for transferring torque to the hub entirely by friction and having an interior bore with a diameter less than 0.5 inch, an outer diameter smaller than the hub, and a depth, the bushing further having an annular width defined as a normal distance between the interior bore and the exterior surface; and
   b. exactly one exterior slot parallel to the shaft for matching a thread slot in the hub, thereby defining an opening for receiving a set screw for drawing the bushing into the hub.

6. A device according to claim 5, wherein the exterior surface of the bushing is tapered at an angle less than three degrees with respect to the axis of the shaft.

7. A device according to claim 5, wherein the bushing is of a material distinct from the first material of the hub.

8. A device according to claim 5, wherein the bushing has a surface finish distinct from the first surface finish of the hub.

9. A device according to claim 5, further including a keyway having a cross-sectional shape for receiving a key for coupling torque between the shaft and the bushing.

10. A device according to claim 9, wherein the cross-sectional shape of the keyway is a portion of a circle.

* * * * *